United States Patent [19]
Ko

[11] Patent Number: 5,823,099
[45] Date of Patent: Oct. 20, 1998

[54] GRILL

[76] Inventor: Li-Sheng Ko, 3/F., No. 245, Jao-Ho St., Taipei City, Taiwan

[21] Appl. No.: 40,344

[22] Filed: Mar. 18, 1998

[51] Int. Cl.$^6$ ............................. A47J 27/00; A47J 37/00; A47J 37/07; H05B 1/02

[52] U.S. Cl. ............................. 99/446; 99/400; 99/451; 99/DIG. 14; 219/405; 219/411; 219/464; 219/497

[58] Field of Search ..................... 99/339, 340, 327–331, 99/400, 401, 447, 450, 449, 444–446, 482, 451, 483, DIG. 14; 126/1 R, 211, 369, 381, 25 R; 219/411, 492, 494, 497, 447, 405, 452, 453, 413, 408, 443, 460–464, 466, 438, 506; 392/411, 418, 419, 422, 424, 432; 422/174, 180; 426/523

[56] References Cited

U.S. PATENT DOCUMENTS

| | | |
|---|---|---|
| 4,516,486 | 5/1985 | Burkhart ............................. 99/447 X |
| 4,728,777 | 3/1988 | Tsisios et al. ............................. 392/418 |
| 4,778,978 | 10/1988 | Schreder et al. ........................ 219/464 |
| 4,868,371 | 9/1989 | Crossley et al. ..................... 219/464 X |
| 5,000,083 | 3/1991 | Pickave ..................................... 99/327 |
| 5,001,328 | 3/1991 | Schreder et al. ........................ 219/449 |
| 5,162,636 | 11/1992 | Randolph, Jr. et al. ................ 219/506 |
| 5,287,799 | 2/1994 | Pickering et al. ........................ 99/446 |
| 5,320,028 | 6/1994 | Grunberg ................................. 99/340 |
| 5,350,927 | 9/1994 | Rakhimov et al. ................. 219/411 X |
| 5,422,460 | 6/1995 | Bralia et al. ........................ 219/460 X |
| 5,424,512 | 6/1995 | Turetta et al. ........................... 219/464 |
| 5,517,005 | 5/1996 | Westerberg et al. ................. 99/451 X |

*Primary Examiner*—Timothy F. Simone
*Attorney, Agent, or Firm*—Rosenberg, Klein & Bilker

[57] ABSTRACT

A grid includes a rectangular rack, a drip plate mounted on the rack, a cooking grid supported on the drip plate, a plurality of halogen lamp tubes transversely arranged in parallel on the rack, a plurality of far-infrared ceramic tubes respectively sleeved onto the halogen lamp tubes and heated to emit far-infrared rays for cooking foods on the cooking grid.

2 Claims, 5 Drawing Sheets

GRILL

BACKGROUND OF THE INVENTION

The present invention relates to a grill for cooking foods, and more particularly to such a grill which uses halogen lamp tubes to heat far-infrared ceramic tubes, causing far-infrared ceramic tubes to emit far-infrared rays for cooking foods carried on a cooking grid above.

When using a grill for cooking foods, charcoal is commonly used and burned for cooking foods put on the grill. However, it is inconvenient to burn charcoal. When charcoal is burning, it produces toxic gas and bad smell. Fuel gas or alcohol may also be used and burned for cooking foods on a grill. However, burning fuel gas or alcohol will also produce toxic gas and bed smell.

SUMMARY OF THE INVENTION

The present invention provides a grill which eliminates the aforesaid drawbacks. According to one aspect of the present invention, the grill comprises a rectangular rack, the rack comprising two long tubes longitudinally arranged in parallel, two short tubes transversely connected between the long tubes at two opposite sides, and four angle fittings respectively connected between the long tubes and the short tubes in four corners, the angle fittings being respectively comprised of an upper shell and a bottom shell fastened together by screws, the long tubes each having a longitudinal series of round holes at an inner side, the angle fittings each having a mounting groove at an inner side; a plurality of ceramic mounting elements respectively fastened to the round holes on the long tubes, the ceramic mounting elements each comprising a first plug portion at one side fitted into one round hole on one long tube of the rack, and a second plug portion at an opposite side, the second plug portion defining a plug hole; a plurality of halogen lamp tubes respectively fastened to the plug holes on the ceramic mounting elements between the long tubes; a power switch mounted on one of the ceramic mounting elements for controlling the operation of the halogen lamp tubes; a plurality of far-infrared ceramic tubes respectively sleeved onto the halogen lamp tubes and fastened to the second plug portions of the ceramic mounting elements between the long tubes; a drip plate mounted on the rack, the drip plate having a mounting flange forced into engagement with the mounting grooves on the ceramic mounting elements; and a cooking grid supported on the drip plate, the cooking grid having a plurality of lugs downwardly extended from two opposite short sides thereof and respectively supported on the drip plate. According to another aspect of the present invention a frying pan may be mounted on rack above the drip plate for frying foods when the cooking grid is removed from the drip plate.

DETAILED DESCRIPTION OF THE PREFERRED EMBODIMENT

Figure 1:
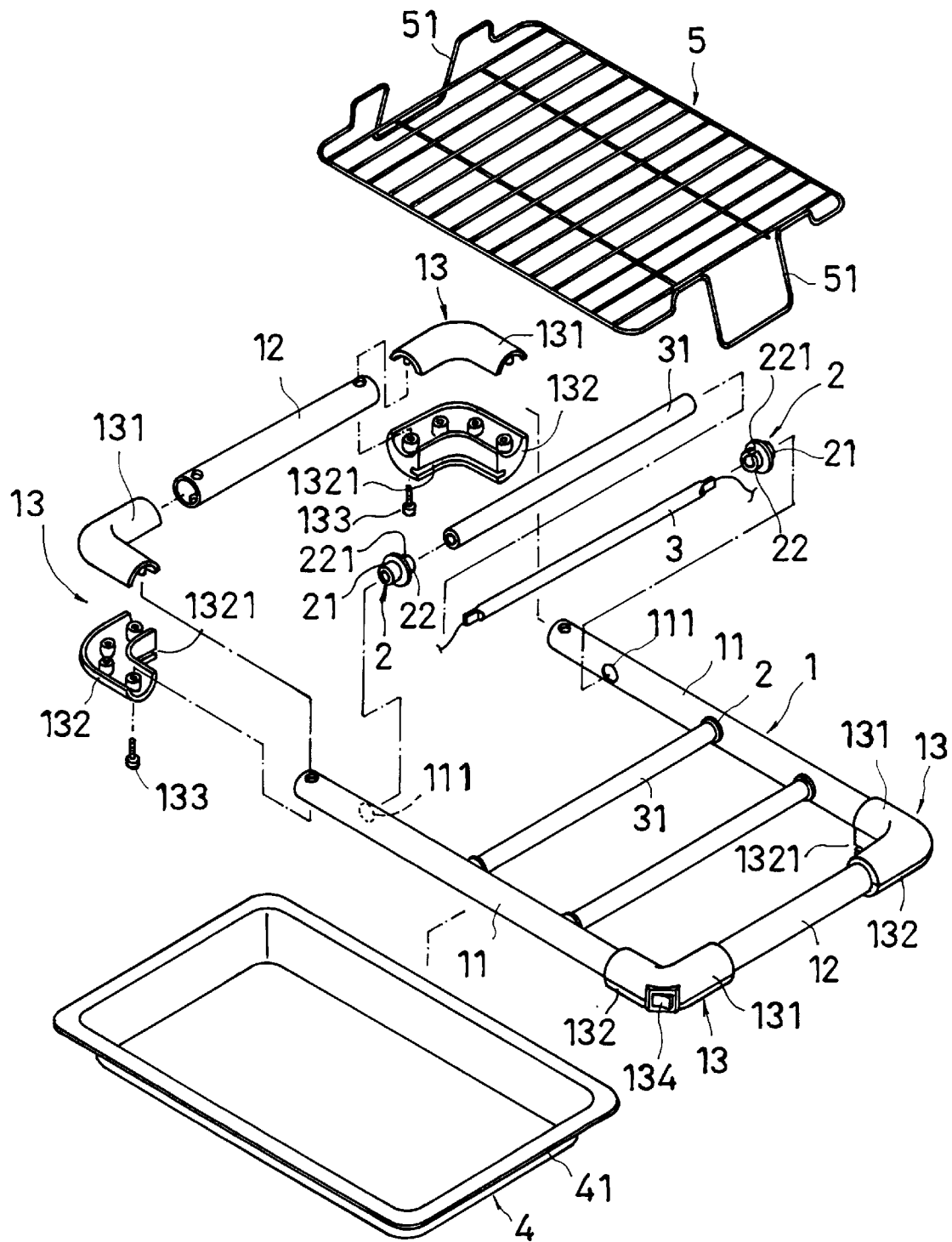
FIG. 1 is an exploded view of a grill according to the present invention.
Figure 2:
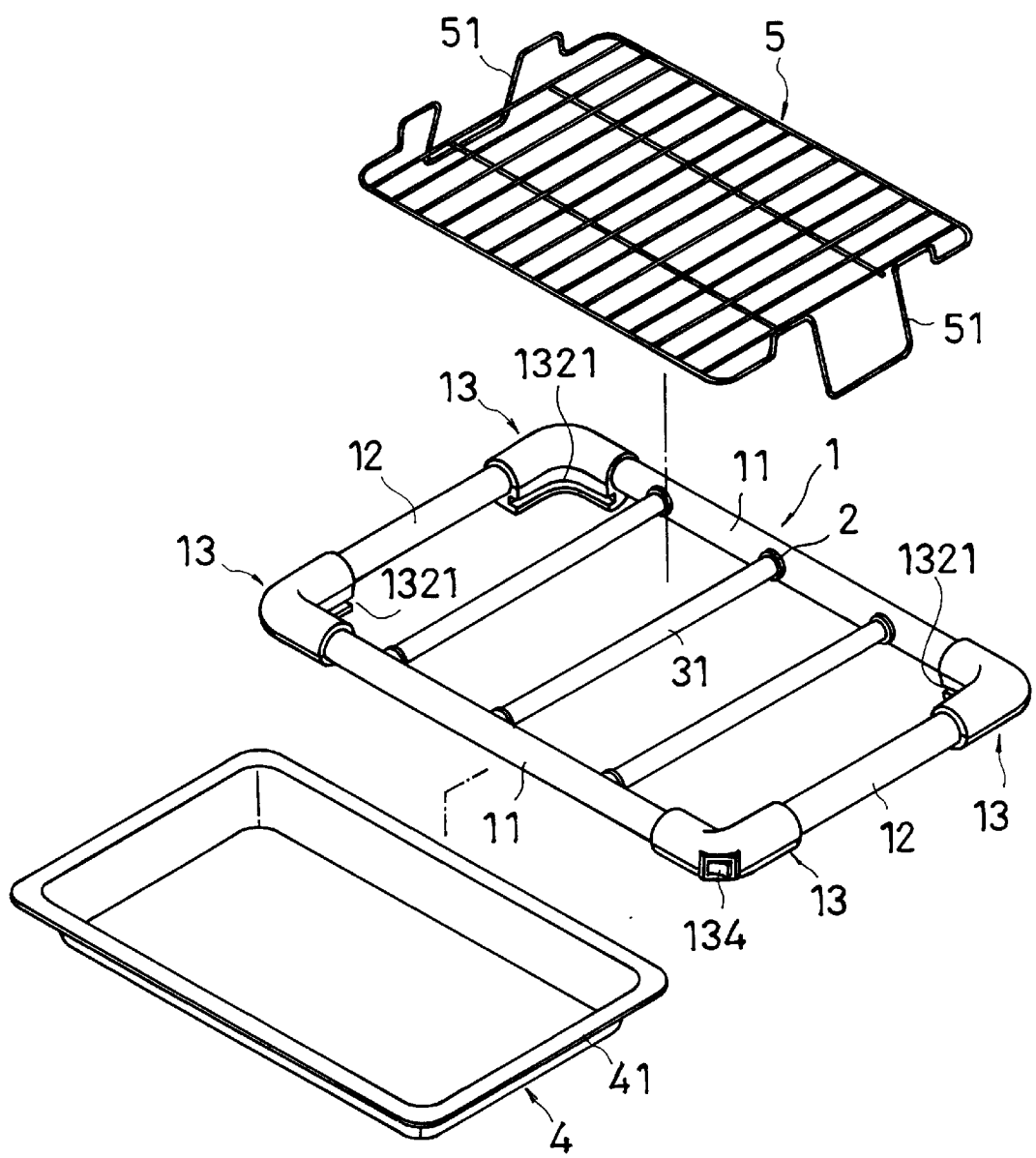
FIG. 2 is similar to FIG. 1 but showing the rack assembled, the far-infrared ceramic tubes installed in the rack.
Figure 3:
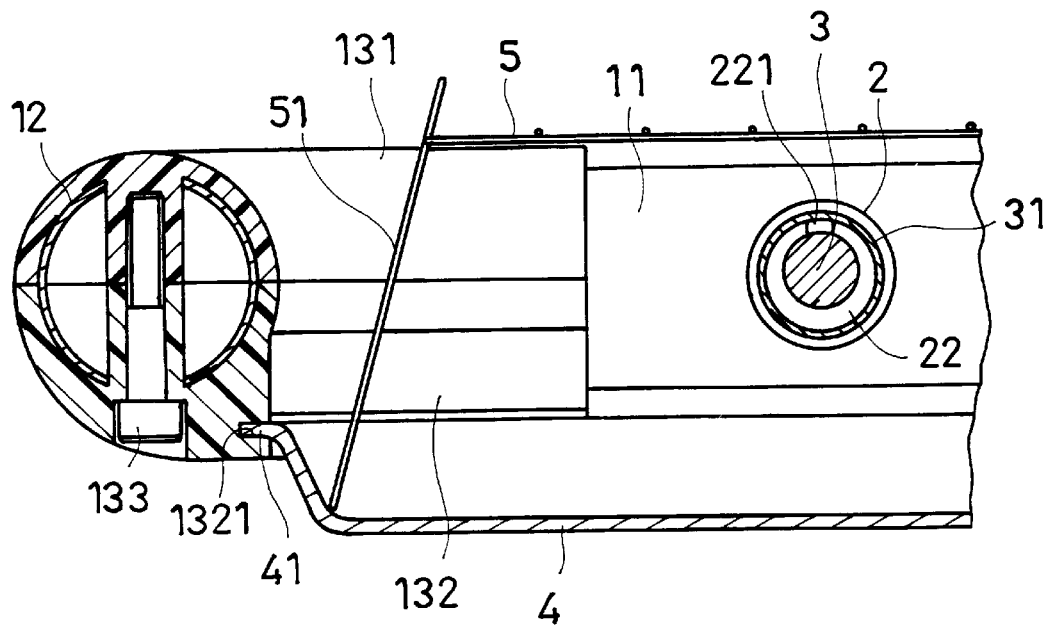
FIG. 3 is a front view in section in an enlarged scale of the grill according to the present invention.
Figure 4:
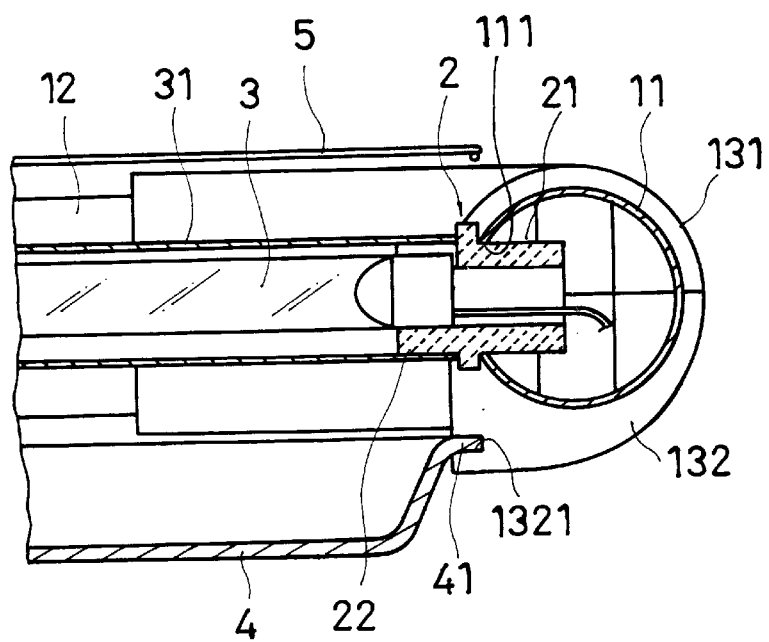
FIG. 4 is a side view in section in an enlarged scale of the grill according to the present invention.

Referring to Figures from 1 to 4, a grill in accordance with the present invention is generally comprised of a cooking grid 5, a rack 1, pairs of ceramic mounting elements 2, a plurality of far-infrared ceramic tubes 31, a plurality of halogen lamp tubes 3, and a drip plate 4.

The rack 1 is comprised of two long tubes 11 longitudinally arranged in parallel, two short tubes 12 transversely connected between the long tubes 11 at two opposite sides, and four angle fittings 13 respectively connected between the long tubes 11 and the short tubes 12. Each angle fitting 13 is comprised of an upper shell 131 and a bottom shell 132 fastened together by screws 133. One angle fitting 13 is mounted with a power switch 134. The long tubes 11 each have a longitudinal series of round holes 111 at an inner side for holding the ceramic mounting elements 2. The ceramic mounting elements 2 each have a first plug portion 21 at one end fitted into one round hole 111 on one long tube 11, and a second plug portion 22 at an opposite end fitted into one end of one far-infrared ceramic tube 31. The second plug portion 22 of each ceramic mounting element 2 defines a plug hole 221 which receives one end of one halogen lamp tube 3. The far-infrared ceramic tubes 31 are respectively fastened to the second plug portions 32 of the ceramic mounting elements 2 between the long tubes 11 of the rack 1. The halogen lamp tubes 3 are respectively mounted in the far-infrared ceramic tubes 31 and fastened to the plug holes 221 on the ceramic mounting elements 2 between the long tubes 11 of the rack 1. After installation, the halogen lamp tubes 3 are connected to the power switch 134. The angle fittings 13 each have a mounting groove 1321 for holding the drip plate 4. The drip plate 4 has a mounting flange 41 raised around the border. The mounting flange 41 of the drip plate 4 is inserted into engagement with the mounting grooves 1321 on the angle fittings 13, enabling the drip plate 4 to be carried on the rack 1. The cooking grid 5 has lugs 51 at two opposite short sides thereof for supporting on drip plate 4. When the power switch 134 is switched on, the halogen lamp tubes 3 are turned on to produce heat, thereby causing the far-infrared ceramic tubes 31 to be heated to release far-infrared rays for cooking foods on the cooking grid 5.

Figure 5:
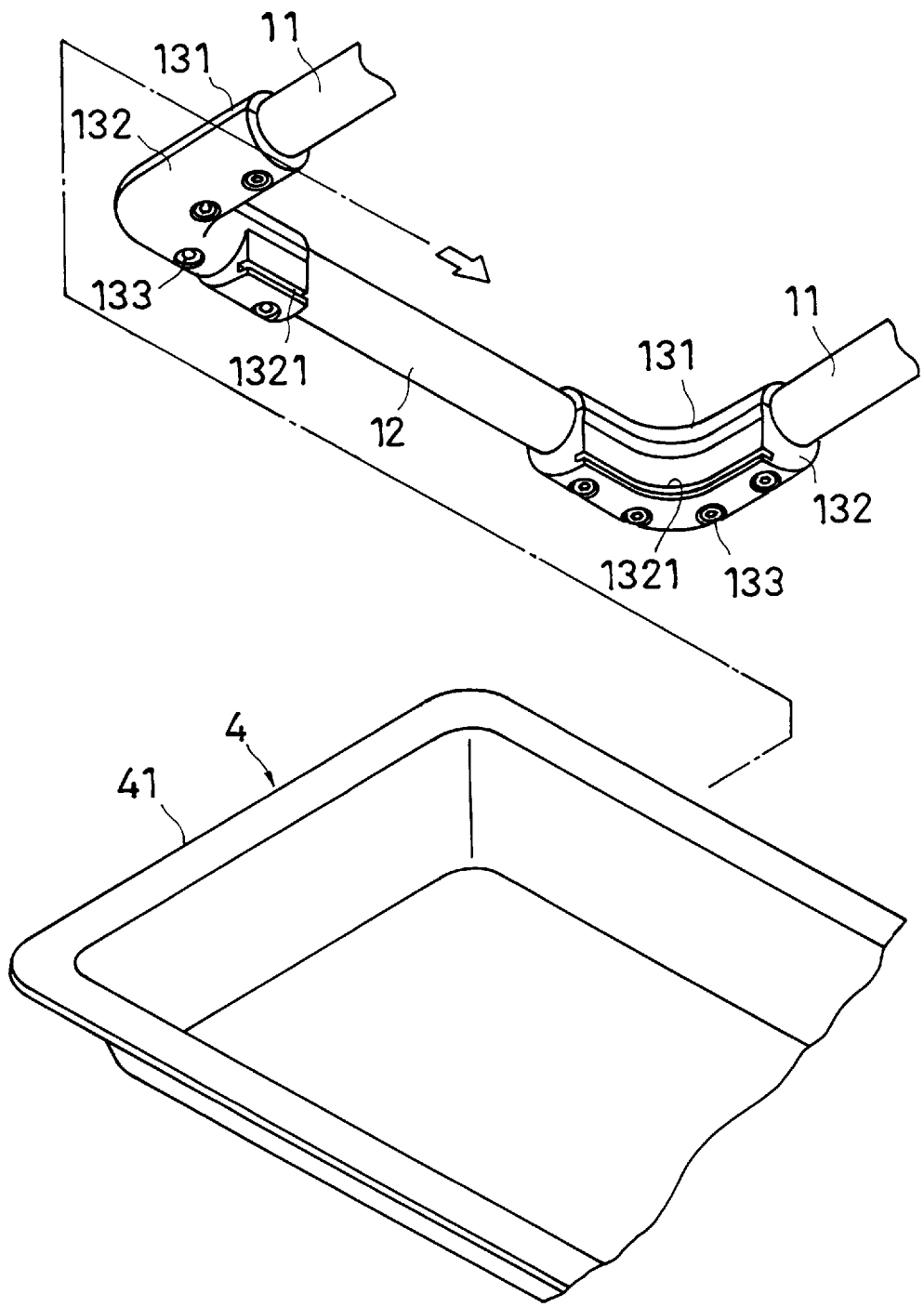
FIG. 5 shows the mounting direction of the drip plate on the rack according to the present invention.

Referring to FIG. 5, because the mounting flange 41 of the drip plate 4 is inserted into engagement with the mounting grooves 1321 on the angle fittings 13, the drip plate 4 can be conveniently removed from the rack 1 for washing.

Figure 6:
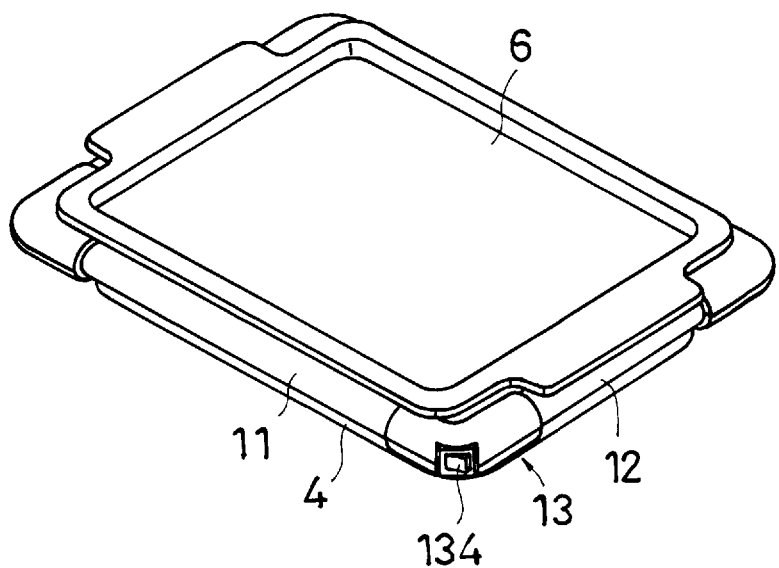
FIG. 6 shows a frying pan mounted on the rack above the drip plate according to the present invention.

Referring to FIG. 6, a frying pan 6 may be mounted on the rack 1 above the drip plate 4 instead of the aforesaid cooking grid 5.

It is to be understood that the drawings are designed for purposes of illustration only, and are not intended as a definition of the limits and scope of the invention disclosed.

What the invention claimed is:

1. A grill comprising:
   a rectangular rack, said rack comprising two long tubes longitudinally arranged in parallel, two short tubes transversely connected between said long tubes at two opposite sides, and four angle fittings respectively connected between said long tubes and said short tubes in four corners, said angle fittings being respectively comprised of an upper shell and a bottom shell fastened together by screws, said long tubes each having a longitudinal series of round holes at an inner side, said angle fittings each having a mounting groove at an inner side;

a plurality of ceramic mounting elements respectively fastened to the round holes on said long tubes, said ceramic mounting elements each comprising a first plug portion at one side fitted into one round hole on one long tube of said rack, and a second plug portion at an opposite side, said second plug portion defining a plug hole;

a plurality of halogen lamp tubes respectively fastened to the plug holes on said ceramic mounting elements between said long tubes;

a power switch mounted on one of said ceramic mounting elements for controlling the operation of said halogen lamp tubes;

a plurality of far-infrared ceramic tubes respectively sleeved onto said halogen lamp tubes and fastened to the second plug portions of said ceramic mounting elements between said long tubes;

a drip plate mounted on said rack, said drip plate having a mounting flange raised around the border thereof and inserted into engagement with the mounting grooves on said ceramic mounting elements; and a cooking grid supported on said drip plate, said cooking grid having a plurality of lugs downwardly extended from two opposite short sides thereof and respectively supported on said drip plate.

2. The grill of claim 1, wherein a frying pan is provided for mounting on said rack above said drip plate when said cooking grid is removed from said drip plate.

* * * * *